United States Patent
Tsitovich

(10) Patent No.: US 10,897,675 B1
(45) Date of Patent: Jan. 19, 2021

(54) TRAINING A FILTER FOR NOISE REDUCTION IN A HEARING DEVICE

(71) Applicant: Sonova AG, Staefa (CH)

(72) Inventor: Aliaksei Tsitovich, Stäfa (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/540,216

(22) Filed: Aug. 14, 2019

(51) Int. Cl.
  *H04R 25/00* (2006.01)
  *G10L 25/84* (2013.01)
  *G06N 3/08* (2006.01)

(52) U.S. Cl.
  CPC ............ *H04R 25/507* (2013.01); *G06N 3/08* (2013.01); *G10L 25/84* (2013.01); *H04R 25/43* (2013.01); *H04R 2225/021* (2013.01); *H04R 2225/025* (2013.01); *H04R 2225/43* (2013.01); *H04R 2225/67* (2013.01)

(58) Field of Classification Search
  CPC ...... H04R 25/00; H04R 25/55; H04R 25/558; H04R 2225/49; H04R 2460/01
  USPC .................................................. 381/312–321
  See application file for complete search history.

(56) References Cited

U.S. PATENT DOCUMENTS

| | | | | |
|---|---|---|---|---|
| 7,773,763 | B2* | 8/2010 | Pedersen | H04R 25/407 381/321 |
| 8,801,592 | B2* | 8/2014 | Jensen | H04R 25/505 600/28 |
| 2006/0204025 | A1* | 9/2006 | Paludan-Muller | H04R 25/505 381/317 |
| 2019/0066713 | A1 | 2/2019 | Mesgarani | |
| 2019/0122689 | A1 | 4/2019 | Jain | |

* cited by examiner

*Primary Examiner* — Suhan Ni

(57) ABSTRACT

The disclosed technology relates to training a neural network and using that training to design a filter for the hearing device. The training can include training a generative adversarial network (GAN) to determine whether a signal includes intelligible speech, wherein the GAN includes a generator and discriminator. The generator can provide a mixed noise and speech signal to the discriminator can output a signal that reduces noise in the mixed signal. The technology can then determine whether the output signal is intelligible based on a speech metric function or based on feedback from a hearing care expert. The generator and the discriminator can continue to train based on this feedback. And then the trained network can use the settings of the discriminator or information from the design of the discriminator to generate a noise filter for a hearing device.

16 Claims, 7 Drawing Sheets

TRAINING A FILTER FOR NOISE REDUCTION IN A HEARING DEVICE

TECHNICAL FIELD

The disclosed technology generally relates to a filter for a hearing device. More specifically, the disclosed technology relates to training a neural network and using that training to design a filter for the hearing device.

BACKGROUND

According to the American Speech-Language-Hearing Association, less than 25 percent of people who need a hearing aid use one. The greatest frustration among potential users is that a hearing aid cannot distinguish between, for example, a voice and the sound of a passing car if those sounds occur at the same time. Further, the hearing device cranks up the volume on both and that can create an incoherent din.

To solve this problem, engineers have failed to achieve speech isolation through signal processing. One approach has been to use a voice-activity detector to identify gaps between people's utterances as they speak. In this approach, the system designates the sounds captured within those gaps as "noise." Then, an algorithm subtracts the noise from the original recording—leaving, ideally, noise-free speech.

Unfortunately, this technique, known as spectral subtraction, is notorious for removing too much speech or too little noise. Too often, what results is an unpleasant artifact that makes the audio sound as if it were recorded underwater. The problems are so serious that even after many years of development, this method does little to improve people's ability to recognize speech in noisy environments. Further, spectral subtraction generally fails to remove unwanted signals in the same or similar frequency ranges (e.g., child voices, TV signals).

Additionally, although spectral subtraction works well in some situations, it works poorly in other situations. For example, the hiss of a ventilation system is different from the hum of a refrigerator compressor, and a hearing device may not be able to remove both sounds in way that produces a satisfactory sound for the hearing device user. Algorithms need to quickly learn to filter out many types of noise, including types different from the ones it has already encountered. Accordingly, there exists a need for a hearing device that improves a user's experience and provides additional benefits.

Figure 1:
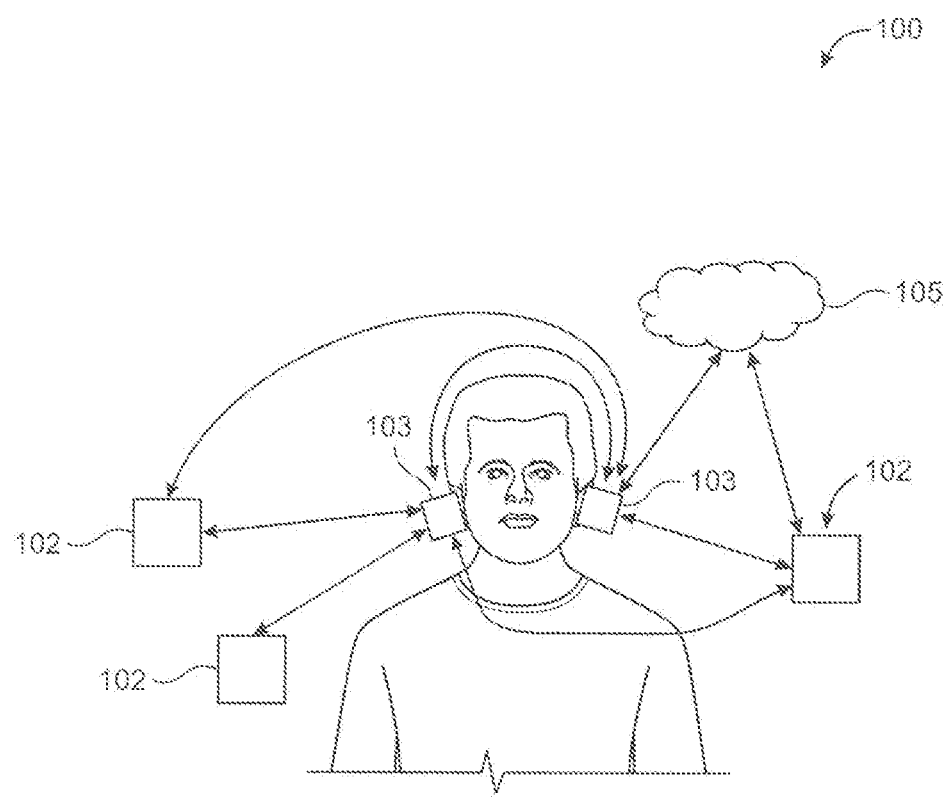
FIG. 1 is a schematic illustration of a hearing device user wearing hearing devices in accordance with some implementations of the disclosed technology.

The drawings are not to scale. Some components or operations may be separated into different blocks or combined into a single block for the purposes of discussion of some of the disclosed technology. Moreover, while the disclosed technology is amenable to various modifications and alternative forms, specific implementations have been shown by way of example in the drawings and are described in detail below. The intention, however, is not to limit the technology to the selected implementations described. Rather, the disclosed technology is intended to cover all modifications, equivalents, and alternatives falling within the scope of the technology as defined by the appended claims.

DETAILED DESCRIPTION

To provide a hearing device that reduces noise, the disclosed technology provides a filter that is designed from a trained neural network. The trained neural network can be a generative adversarial network (GAN). And the training of the neural network is based on objective and subjective speech quality measures as disclosed in this application.

The GAN can include two components: a generator and a discriminator. The generator generates mixed signals based on noise and speech samples. The discriminator discriminates between the noise and speech portions of the mixed signals and generates output signals that have reduced noise (e.g., noise free signals). For example, the discriminator can filter or reduce the noise portion of a mixed signal that contains speech and noise, wherein the generator generated the mixed signal. The discriminator can output an output signal that includes reduced noise, and the discriminator can generate several output signals (e.g., first, second, third, etc.) based on the same input mixed signal or based on different mixed signals from the generator.

The disclosed technology begins with the generator of the GAN generating a mixed signal based on mixing a sample from a speech dataset with a sample from a noise dataset. The generator can mix the signals at different ratios based on random variation of speech to noise (e.g., 50/50, 60/40, 70/30, etc.). The generator can also randomly vary the volume, amplitude, or other feature of the speech or noise signal. The generator can then send this generated signal based on the mixing of noise and speech to the discriminator.

In response to receiving the generated mixed signal and based on discriminating between the speech portion and noise portion of a mixed signal, the discriminator can output an output signal that contains intelligible speech. For example, the discriminator can implement a digital signal processing function (e.g., directly or indirectly—via devised DSP filter constants) to produce an output signal with reduced noise for the hearing device.

The generator and the discriminator have opposite objectives with respect to speech intelligibility. Speech intelligibility is a measure of how comprehensible speech is in given conditions. Intelligibility is affected by a level and quality of the speech signal, the type of background noise, and the level of background noise. The generator's objective is to generate a mixed signal that causes the discriminator to generate an output signal that does not have speech intelligibility, while the discriminator's objective is to generate an output signal based on the mixed signal that does have speech intelligibility. Based on this adversarial training, the generator and discriminator can optimize an output signal based on speech intelligibility.

To evaluate speech intelligibility, a speech metric function can use mean opinion score (MOS) or perceptual evaluation of speech quality (PESQ) to measure speech intelligibility of output signals from the discriminator. MOS is the arithmetic mean over all individual values on a scale that a subject assigns to his opinion of the performance of a system quality. MOS also gives a numerical indication of the perceived quality of the speech intelligibility. MOS has a scale of 1-5, where 5 means easy to understand and 1 means not possible to understand. More information regarding the MOS score can be found in "*Series P: Terminals and Subjective and Objective Assessment Methods*," published in July 2016 by the International Telecommunication Union (ITU), which is incorporated herein by reference for its entirety. Further, the speech metric function can also measure speech intelligibility using PESQ because it relates to a method of speech quality as provided by the ITU in its recommendation "Series P: Telephone Transmission Quality, Telephone Installations, and Local Line Networks," published in February 2001 P.862 (02/01) by ITU, which is incorporated herein by references for its entirety. More information regarding how these speech intelligibility standards are used by the GAN are disclosed in FIGS. 2-5C. The speech metric function can be implemented in a speech metric function into that is configured to communicate with the GAN, the discriminator, the generator.

In addition to objectively measuring speech intelligibility using a speech metric function, the disclosed technology can also measure speech intelligibility subjectively using a hearing care expert (HCE). The HCE is a person that is trained in analyzing output signals for speech intelligibility; in some implementations, the HCE can be simulated by a machine learning algorithm based on training with several HCEs. The HCE can provide feedback about speech intelligibility and the feedback can be provided to the GAN, the discriminator, or the generator. The GAN can use this feedback to further train and improve (e.g., optimize) the filter.

The datasets used to train the GAN can be speech and noise datasets. The speech datasets (also referred to as "speech samples") can be based on asking users to speak into a mobile device (e.g., mobile phone). In some implementations, the mobile device instructs the user to record the speech sample in a quiet environment such that the signal-to-noise ratio (SNR) will be above a threshold (e.g., 4 dB). The noise samples can be based on a dataset of noise signals. The noise signals can include noise related to traffic, wind, music, multiple voices, or other background noise from real-life listening situations. The noise samples can be collected from microphones or mobile computing devices with microphones placed in environments with noise (e.g., classrooms, restaurants, theaters, concert halls or venues, windy areas, etc.). Further, the noise samples can be based on publicly available databases with noise samples (e.g., available over the internet).

Also, in some implementations, the disclosed technology can ask a user for his or her own voice samples and train the GAN based on using the own voice samples (e.g., after training on the speech and noise datasets from other users).

In some implementations, the disclosed technology solves a technical problem with a practical application of a technical solution. For example, the hearing device can include a filter using by a digital signal processor (DSP), wherein the filter is configured to remove noise or reduce noise based on a neural network training. Because the filter is based on a GAN that was trained from mixing speech and noise samples, the filter can effectively remove real-life noise to provide speech intelligibility (e.g., high SNR). Further, in some implementations the hearing device can also continuously learn from the hearing device user's own voice to improve the filter even further. More generally, the disclosed technology can train the GAN objectively (e.g., with speech metric function), subjectively (e.g., with the HCE), and personally with the user's own voice. Accordingly, a filter produced from the trained GAN should be well suited for a hearing device user in any hearing environment.

FIG. 1 illustrates a communication environment 100. The communication environment 100 includes wireless communication devices 102 and hearing devices 103. As shown by double-headed bold arrows in FIG. 1, the wireless communication devices 102 and the hearing devices 103 can communicate wirelessly. Wireless communication can include using a protocol such as Bluetooth BR/EDR™, Bluetooth Low Energy™, a proprietary communication (e.g., binaural communication protocol between hearing aids or bimodal communication protocol between a hearing aid and hearing device), ZigBee™, Wi-Fi™, or an Industry of Electrical and Electronic Engineers (IEEE) wireless communication standard protocol.

The user in FIG. 1 may be at a restaurant, conference, movie theater, performance, or concert and the user likely prefers to hear conversation over background noise. The hearing devices 103 can assist with providing the user with a signal that has a reduced noise output (e.g., it was filter by the hearing device to remove noise). The filter can be based on a GAN and the filter can be used by a digital signal processor for the hearing device 103 as further disclosed in FIGS. 2-5C. Some example hearing devices include hearing aids, headphones, earphones, assistive listening devices, or any combination thereof; and hearing devices include both prescription devices and non-prescription devices configured to be worn on or near a human head. As an example of a hearing device, a hearing aid is a device that provides amplification, attenuation, or frequency modification of audio signals to compensate for hearing loss or difficulty; some example hearing aids include a Behind-the-Ear (BTE), Receiver-in-the-Canal (MC), In-the-Ear (ITE), Completely-in-the-Canal (CIC), Invisible-in-the-Canal (IIC) hearing aids or a cochlear implant (where a cochlear implant includes a device part and an implant part).

Also, the hearing devices 103 are configured to binaurally communicate or bimodally communicate. The binaural communication can include a hearing device 103 transmitting information to or receiving information from another hearing device 103. Information can include volume control, signal processing information (e.g., noise reduction, wind canceling, directionality such as beam forming information), or compression information to modify sound fidelity or resolution. Binaural communication can be bidirectional (e.g., between hearing devices) or unidirectional (e.g., one hearing device receiving or streaming information from another hearing device). Bimodal communication is like binaural communication, but bimodal communication includes a cochlear device communicating with a hearing aid. For example, the hearing devices 103 can communicate filter information or exchange filters.

The wireless communication devices 102 are computing devices that are configured to wirelessly communicate.

Wireless communication includes wirelessly transmitting information, wirelessly receiving information, or both. The wireless communication devices 102 can be used to gather sound samples or speech samples, and the GAN can use these samples to train as disclosed further in FIGS. 2-5C.

The wireless communication devices 102 shown in FIG. 1 can include computers (e.g., desktop, server, laptop), televisions (TVs) or components in communication with television (e.g., TV streamer), a car audio system or circuitry within the car, a mobile device (e.g., smartphone), tablet, remote control, an accessory electronic device, a wireless speaker, or watch. In some implementations, the wireless communication devices 102 are servers that are configured to operate GANs or other neural networks. It should be noted that the hearing device 103 is also a wireless communication device 102, but the hearing device 103 is configured to provide audio to a user in addition to wirelessly communicating with other devices.

The network 105 is a communication network. The network 105 enables the hearing devices 103 or the wireless communication devices 102 to communicate with a network or other devices. The hearing devices 103 and the wireless communication devices 102 can use the network to perform operations such as transmitting or receiving a trained filter from a server that is running a GAN. The hearing devices 103 and the wireless communication devices 102 can also communicate with other devices that using the GAN to train the filter, e.g., such as a server farm or data processing center. Furthermore, the devices can send updates or receive information via the network 105.

The network 105 can be a Wi-Fi™ network, a wired network, or a network implementing any of the Institute of Electrical and Electronic Engineers (IEEE) 802.11 standards. The network 105 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In some implementations, the network 105 can include communication networks such as a Global System for Mobile (GSM) mobile communications network, a code/time division multiple access (CDMA/TDMA) mobile communications network, a 3rd, 4th or 5th generation (3G/4G/5G) mobile communications network (e.g., General Packet Radio Service (GPRS)) or other communications network such as a Wireless Local Area Network (WLAN).

Figure 2:
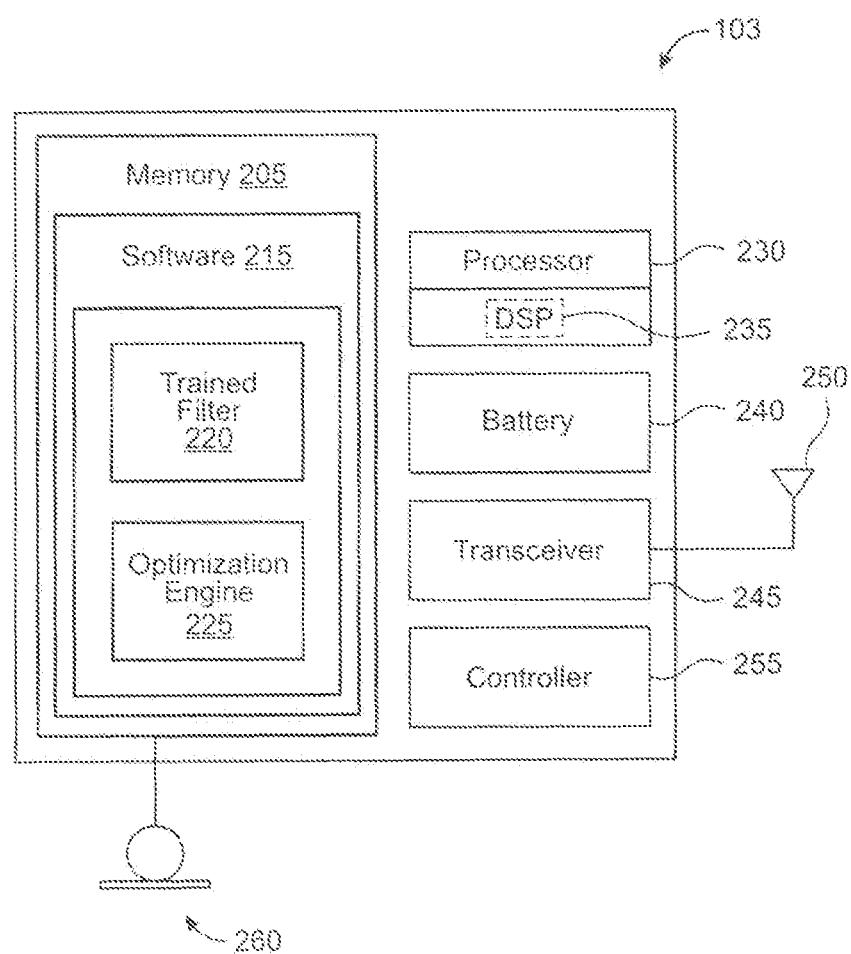
FIG. 2 is a schematic illustration of a hearing device from FIG. 1 in more detail in accordance with some implementations of the disclosed technology.

FIG. 2 is a block diagram illustrating the hearing device 103 from FIG. 1 in more detail. FIG. 2 illustrates the hearing device 103 with a memory 205, software 215 stored in the memory 205, the software 215 includes a trained filter 220 and an optimization engine 225. The hearing device 103 also includes a processor 230 (e.g., with a DSP 235), a battery 240, a transceiver 245, a controller 255, a microphone 260, and an antenna 250. More generally, the components of the hearing device 103, including the trained filter 220 from the GAN network, can provide an audio signal to hearing device user, wherein the audio signal has a reduce noise.

The memory 205 stores instructions for executing the software 215 comprised of one or more modules and data utilized by the modules. The modules perform certain methods or functions for the hearing device 103 and can include components, subcomponents, or other logical entities that assist with or enable the performance of these methods or functions. For example, the modules can store algorithms for carrying operations of the GAN network or filter operations.

Although a single memory 205 is shown in FIG. 2, the hearing device 103 can have multiple memories 205 that are partitioned or separated, where each memory can store different information.

The trained filter 220 is a set of instructions or weights for filtering sound to reduce noise. The trained filter 220 can be used to filter or adjust digital signals received from the hearing device microphone, provided to the hearing device speaker, or from/to another component of the hearing device (e.g., via a Bluetooth™ connection). The trained filter 220 can be a low-pass, high-pass, band-pass, notch, band-reject, or combination filter. The trained filter 220 can also have non-linear functions for filtering sound (e.g., based on the trained GAN). The trained filter 220 is accessible by the processor 230, which may also have access to a DSP 235 to process audio signals according to the trained filter 220. The trained filter 220 can be received from the GAN, which is described in more detail in FIGS. 3A-5C.

The optimization engine 225 can be used to improve (e.g., optimize) the listening experience for the hearing device user. Specifically, in some implementations, the optimization engine 225 can receive feedback from the hearing device user that indicates the user is still hearing a significant amount of noise or is having difficulty understanding some speech in noise. The optimization engine 225 can save listening conditions related to difficult listening situations and then provide these conditions (e.g., sound samples, SNR values) to a wireless communication device 102. The wireless communication device 102 can receive the sound condition information and provide it to the GAN for the further training.

The processor 230 can include special-purpose hardware such as application specific integrated circuits (ASICs), programmable logic devices (PLDs), field-programmable gate arrays (FPGAs), programmable circuitry (e.g., one or more microprocessors microcontrollers), Digital Signal Processor (DSP), appropriately programmed with software and/or computer code, or a combination of special purpose hardware and programmable circuitry.

Also, although the processor 230 is shown as a separate unit in FIG. 2, the processor 230 can be on a single chip with the transceiver 245, the controller 255, and the memory 205. The processor 230 can also include a DSP configured to modify audio signals based on hearing loss or hearing programs stored in the memory 205. In some implementations, the hearing device 103 can have multiple processors, where the multiple processors can be physically coupled to the hearing device 103 and configured to communicate with each other.

The battery 240 can be a rechargeable battery (e.g., lithium ion battery) or a non-rechargeable battery (e.g., Zinc-Air) and the battery 240 can provide electrical power to the hearing device 103 or its components.

The microphone 260 is configured to capture sound and provide an audio signal of the captured sound to the processor 230. The processor 230 can modify the sound (e.g., in the DSP 235) and provide the modified sound to a user of the hearing device 103. Although a single microphone 260 is shown in FIG. 2, the hearing device 103 can have more than one microphone. For example, the hearing device 103 can have an inner microphone, which is positioned near or in an ear canal, and an outer microphone, which is positioned on the outside of an ear. As another example, the hearing device 103 can have two microphones, and the hearing device 103 can use both microphones to perform beam forming operations.

The controller 255 controls transmission or reception of packets based on requests from wireless communication protocols or other requests from the hearing device 103 (e.g., from the processor 230). The controller 255 can be implemented in hardware (e.g., part of the processor 230 or be a separate unit), software (e.g., part of software 215), or a combination of software and hardware. The controller 255 can be configured to communicate with the transceiver 245 to transmit or receive packets. The controller 255 communicates with the transceiver 245.

The transceiver 245 communicates with the antenna 250 to transmit or receive information. The antenna 250 is configured to operation in unlicensed bands such as Industrial, Scientific, and Medical Band (ISM)) using a frequency of 2.4 GHz. The antenna 250 can also be configured to operation in other frequency bands such as 5 GHz, 5 MHz, 10 MHz, or other unlicensed bands.

Although not shown in FIG. 2, the hearing device 103 can also include a transducer to output audio signals (e.g., a loudspeaker or a transducer for a cochlear device configured to convert audio signals into nerve stimulation or electrical signals).

Figure 3A:
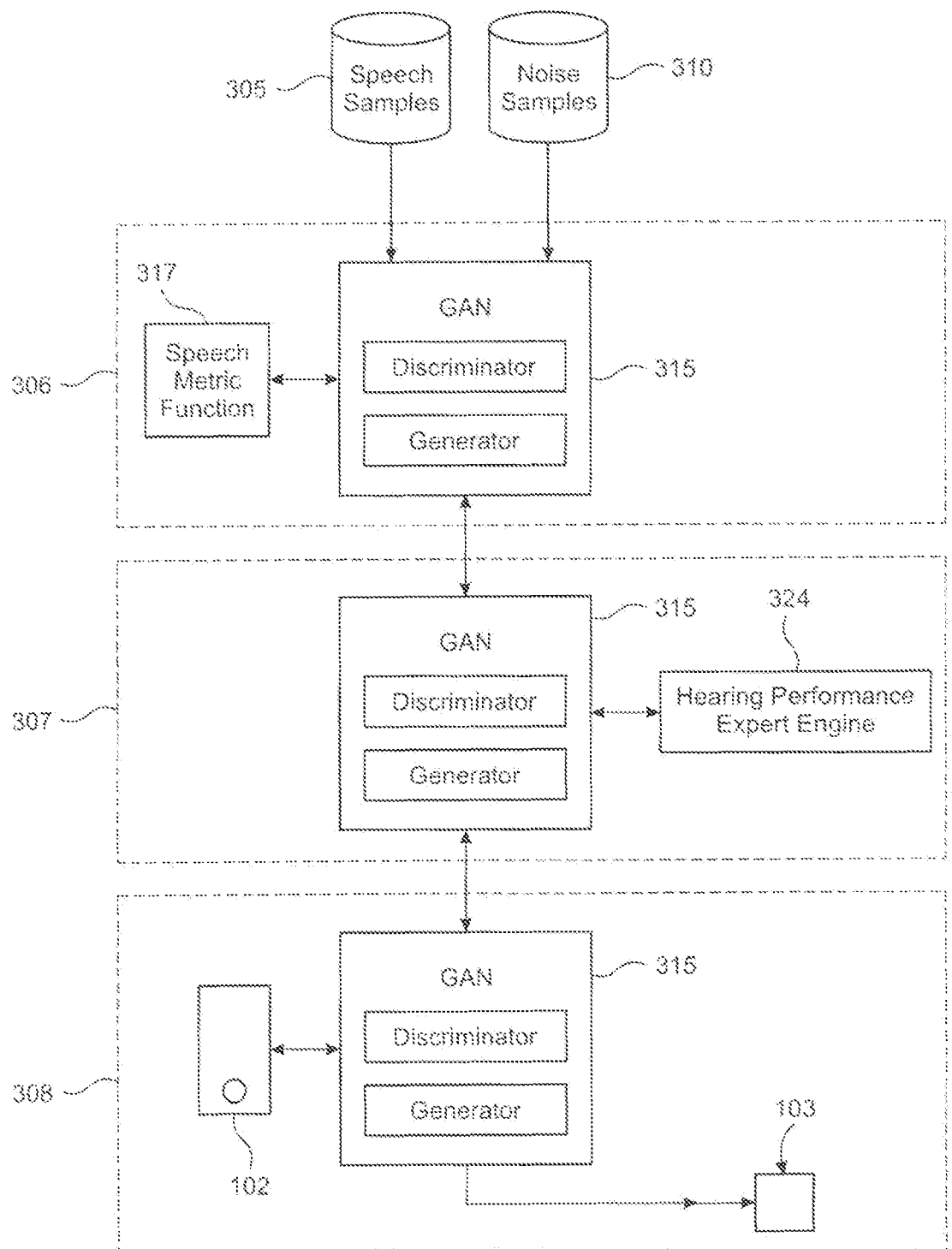
FIG. 3A is a block diagram for a neural network that can be used to generate a filter for a hearing device in accordance with some implementations of the disclosed technology.

FIG. 3A is a block diagram for a GAN that can be used to generate a filter for the hearing device 103. FIG. 3A includes a speech samples database 305 and a noise samples database 310. The speech samples database 305 stores speech samples (e.g., received from user's speaking on the phone or as part of a survey). The speech samples database 305 includes samples that are recorded in a high SNR environment or above a threshold SNR (e.g., greater than 4 dB SNR). The noise samples database 310 stores noise samples received from various sound environments. These speech and noise samples can be used by the GAN.

The GAN is shown in three different stages in FIG. 3A. The first stage 306 includes training the GAN using a speech metric function (e.g., MOS or PESQ), which can be implemented as a speech metric function unit. The second stage 307 includes training the GAN using a hearing performance expert engine. For example, the results of the discriminator can be reviewed by a HCE, and the HCE can determine whether speech is intelligible in a signal and/or whether a hearing user device would be comfortable hearing the signal. The user's voice can be received from wireless communication devices 102 (FIG. 2), e.g., using a mobile phone. The third stage 308 includes training the GAN 315 using a user's voice (e.g., in addition to speech samples in the speech data set 305).

Each stage corresponds to a different process. The overall process is described in FIG. 4, the first stage 306 relates to process 500 in FIG. 5A, the second stage 307 relates to process 530, and the third stage 308 relates to process 550. Also, after the GAN 315 has been trained in the third stage 308, the GAN 315 can provide a filter to a hearing device 102, where the hearing device 103 can use that filter for reducing noise.

Figure 3B:
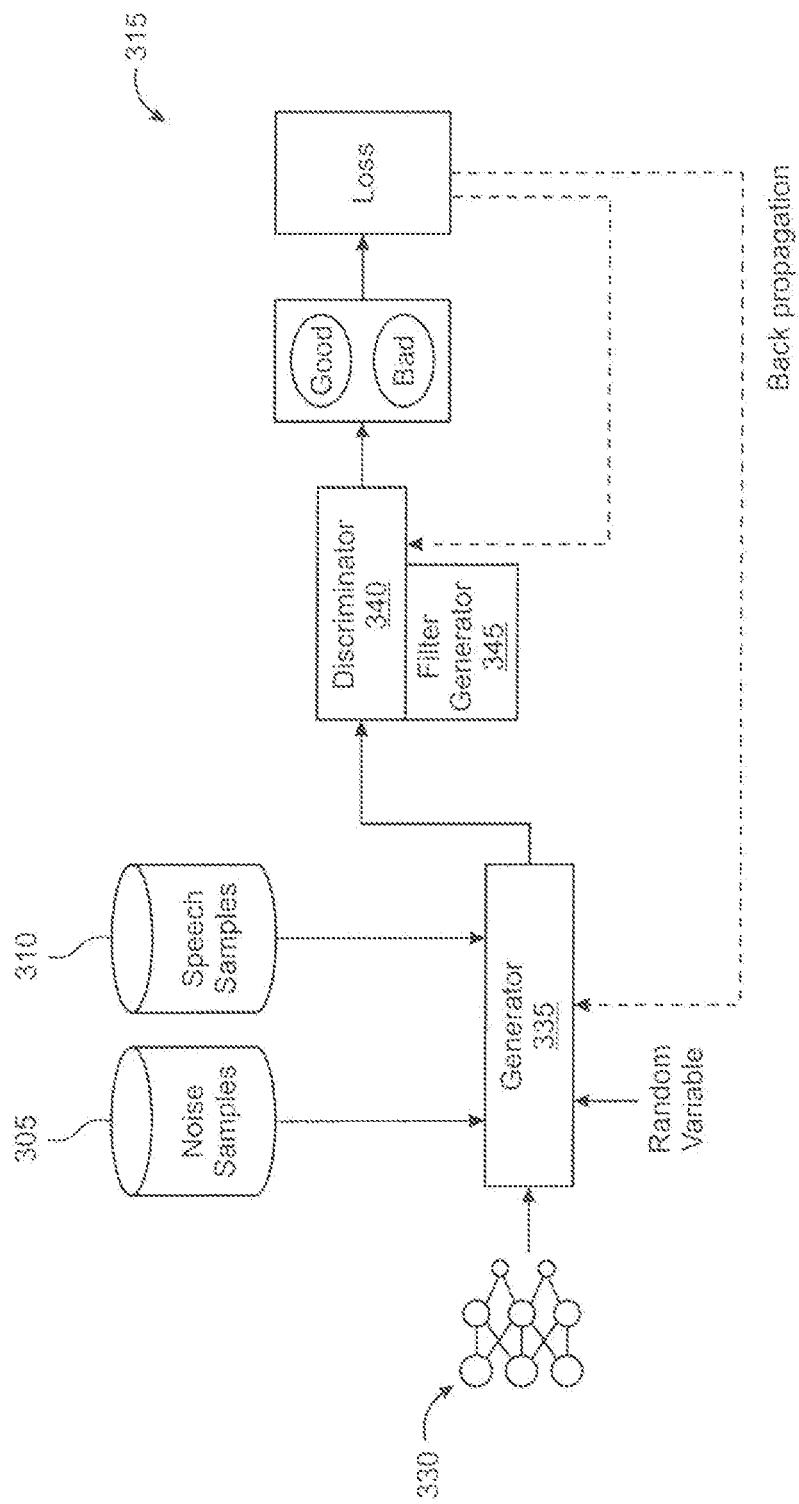
FIG. 3B is another block diagram of the neural network that can be used to generate a filter for a hearing device in accordance with some implementations of the disclosed technology.

FIG. 3B is another block diagram of the GAN 315 from FIG. 3A. A generator 335 of the GAN 315 can randomly vary mixing of speech samples and noise samples to generate a mixed signal and provide it to the discriminator. The network layers 330 show that the generator 335 can have layers used to generate an input signal sent to the discriminator 340. The network layers 330 can be a dimensional vector latent space to a data distribution, while the discriminative network distinguishes candidates produced by the generator from the true data distribution. The generator 335 is shown schematically in FIG. 3B, but it can include software, custom hardware (e.g., an ASIC), or a combination thereof. Although not shown, the discriminator 340 can also have layers.

The discriminator 340 can output an output signal where the noise portion of the input signal compared to the speech signal is reduced. The discriminator 340 can communication with a filter generator 345, wherein the filter generator 345 is a digital filter to reduce or remove noise from a signal. The discriminator 340 can adjust the weights or settings of the filter generator 345 continuously, e.g., as the discriminator 340 learns or trains on new data (e.g., mixed signals from the generator 335). The generator 335 is shown schematically in FIG. 3B, but it can include software, custom hardware (e.g., an ASIC), or a combination thereof.

As generally shown in FIG. 3B, the discriminator 340 can generate an output signal where noise portion of a signal is removed or reduced such that the output signal has intelligible speech (e.g., the discriminator filtered the mixed signal from the generator). Second, the discriminator 340 can output whether a generated signal was "good" or "bad", wherein good generally means the output signal could be understood by a person and a bad signal could not be understood by a person. The good or bad rating is based on the speech metric function 317 (FIG. 3A) in the first stage 306, the feedback from the hearing performance expert engine (e.g., an HCP at fitting station) in stage 307, and based on the speech metric function 317 in stage 3 except a user's own voice is used as part of the speech signal input for the generator. If a generated signal is rated as bad, the loss, which is the difference between a good and bad signal, is sent to the generator through a back-propagation channel. The discriminator uses this back-propagation channel information to improve its error rate at discriminating good versus bad signals, while generator uses this back-propagation channel to configure mixing signals that confuse the discriminator. The GAN 315 continues to generate signals until the error rate or loss is reduced (e.g., minimized).

Also, as shown in FIG. 3B, the discriminator 340 can be in communication with a filter generator 345. The filter generator 345 is a digital filter designed to reduce the noise in a mixed signal received from the generator. The filter values or settings of the discriminator 340 can be used to design a filter for the hearing device 103 (e.g., used to design a filter for DSP for a hearing device). The resulting state of the discriminator 340, such as the values and settings in the layers of the discriminator, can be used design a speech filter for the hearing device 103.

Figure 4:
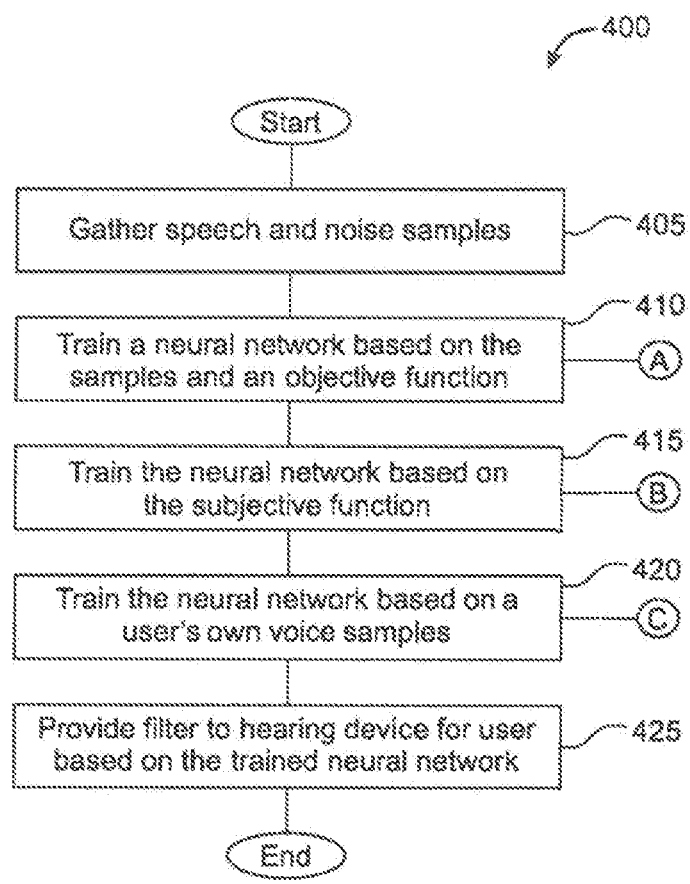
FIG. 4 is a block-flow diagram for a process to provide a filter to a hearing device in accordance with some implementations of the disclosed technology.

FIG. 4 illustrates a block flow diagram for a process 400 for training a GAN and then using that trained GAN to provide a filter to a hearing device. In some implementations, part of the process 400 may be carried out on more than one device. For example, on a server, on a computer at hearing care professional's office, on a mobile device, or on the hearing device. The process 400 begins with a gather operation 405 and continues with objective train operation 410. The process 400 can also be referred to as an algorithm for training a filter for a hearing device.

At gather operation 405, a computer receives speech and noise samples and stores these samples as datasets in a database. The noise samples can be gathered based on microphones placed in different locations. For example, the microphones can be placed in restaurants, movie theaters, intersections, parks, or other outdoor areas. The noise samples can also be gathered from a network of hearing devices, wherein each hearing device transmits a recording of noise it picks up in addition to its location (e.g., GPS signal). The computer, hearing device, or GAN network can access the noise and/or sample data sets via a network.

Regarding the speech samples, the disclosed technology can receive these speech samples from variety of sources. For example, a survey can be sent to many people where the survey asks each person to record a few seconds (or minutes) or speech in a quiet environment. The speech samples can also be gathered from public speech databases (e.g., libraries with recordings of speech). In some implementations, the process 400 can require that the speech samples have a high SNR (e.g., greater than 4 dB) such that the speech samples are high-quality and/or have reduced noise.

Figure 5A:
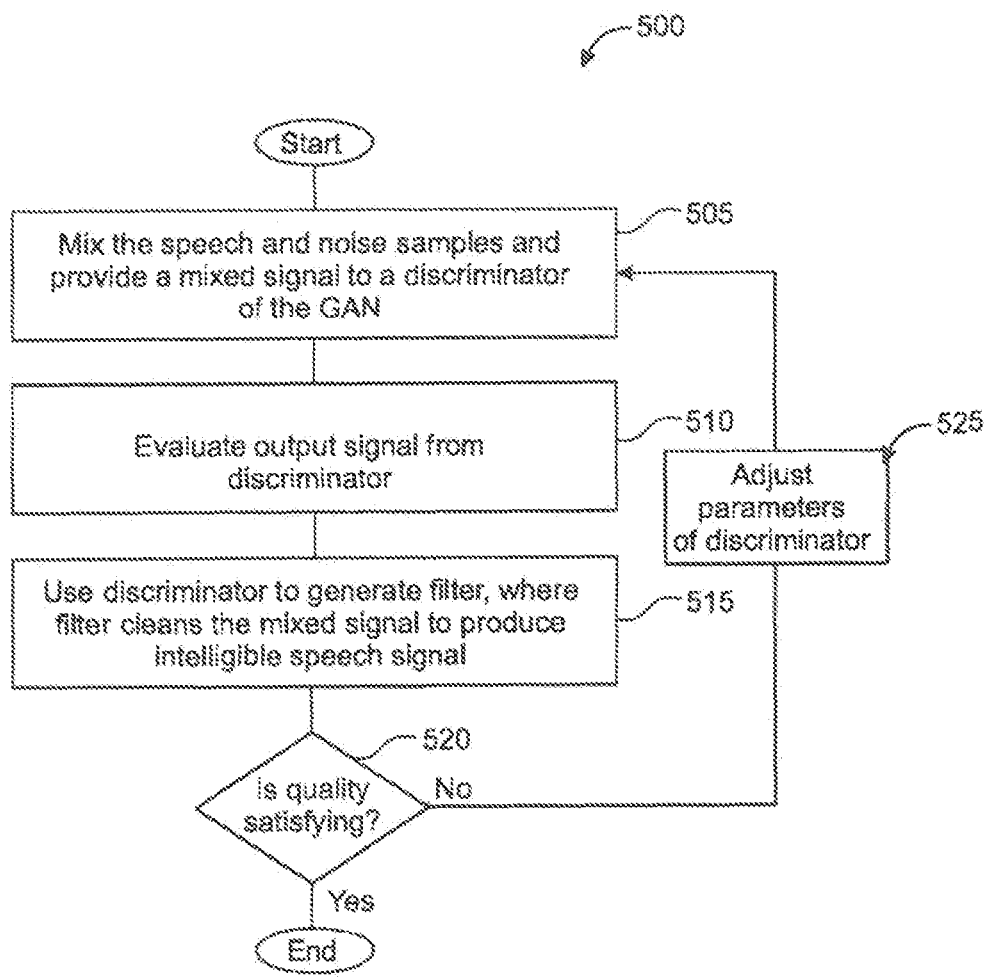
FIG. 5A is a more detailed block-flow diagram for a portion of the process from FIG. 4 in accordance with some implementations of the disclosed technology.

At objective train operation 410, the disclosed technology trains a GAN based on an objective function. More details regarding the process for training the GAN based on an objective function as disclosed in "A", which is shown in FIG. 5A. As a generally overview, the generator of a GAN generates audio signals based on mixing the speech and noise samples. The generator can randomly vary the portions of speech and noise that it mixes as well as other properties of the audio signal (e.g., amplitude, volume, etc.).

After the generator generates a mixed signal it provides the mixed signal to the discriminator. The discriminator filters or processes the mixed signal and attempts to reduce (e.g., remove or eliminate) noise from the mixed signal. After the discriminator removes noise from the mixed signal, it outputs an output signal.

The output signal is provided to a speech metric function, and the speech metric function determines whether the output signal has speech intelligibility. The speech metric function can determine whether the output signal is "good" or "bad" based on MOS or PESQ. Feedback from whether the signal is good (i.e., good speech intelligibly) or bad (i.e., bad speech intelligibility) is provided to generator and the discriminator via a back propagation, which is how the GAN network is trained (e.g., it learns from this back propagation).

Figure 5B:
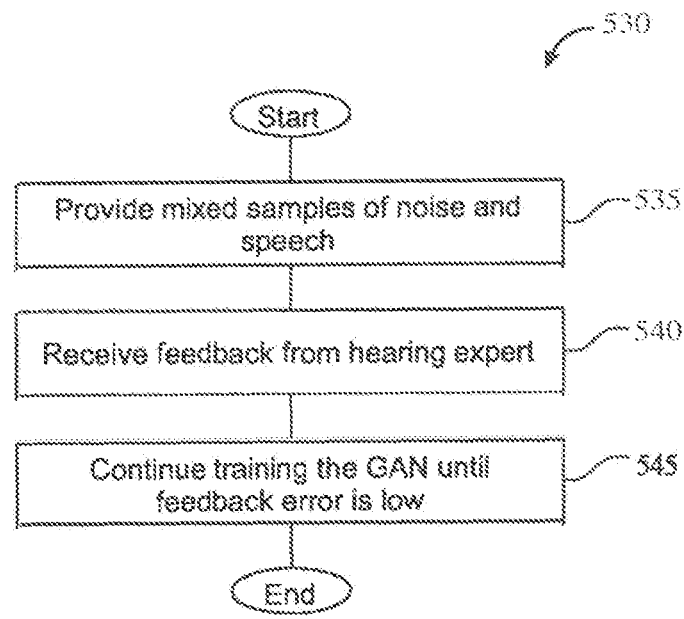
FIG. 5B is a more detailed block-flow diagram for a portion of the process from FIG. 4 in accordance with some implementations of the disclosed technology.

At subjective train operation 415, the disclosed technology trains the GAN based on a subjective function (e.g., the hearing performance expert engine from FIG. 3A). In some implementations, the subjective training operation 415 occurs directly after the objective train operation 405. More details regarding the process for training the GAN based on a subjective function are disclosed in "B", which is shown in FIG. 5B. More generally, as compared to objective training based on a speech metric function in objective operation 410, the GAN network determines whether an output signal from the discriminator is has "good" or "bad" speech intelligibility based on the hearing performance expert engine (e.g., feedback from hearing performance expert or a machine learning algorithm that simulates a hearing performance expert).

Figure 5C:
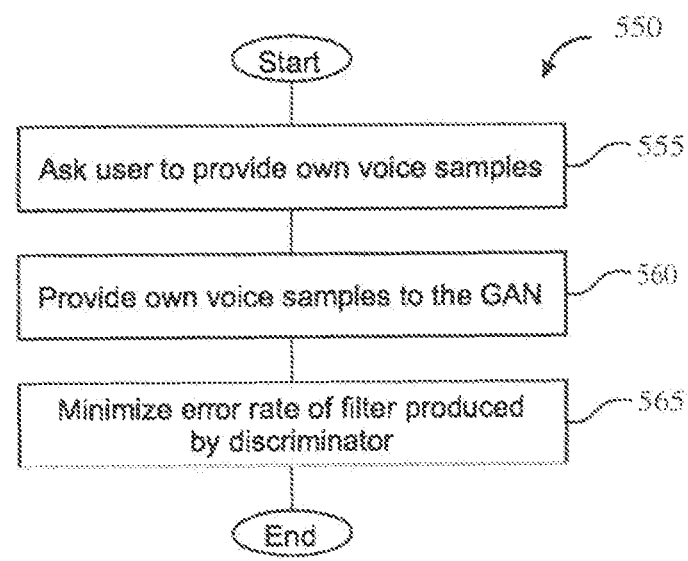
FIG. 5C is a more detailed block-flow diagram for a portion of the process from FIG. 4 in accordance with some implementations of the disclosed technology.

At personalized train operation 420, the disclosed technology trains the GAN based on a hearing device user's own voice and provides a filter based on that training. More details regarding the process for training the GAN based on own voice samples are disclosed in "C", which is shown in FIG. 5C. For example, a mobile device and mobile application that belong to the user can be used to receive own voice samples from the user. The mobile device can then transmit these own voice samples to the network 105 and the GAN can use these own voice samples to train the GAN. Based on the adjustments to the GAN from the own voice samples, the GAN network or disclosed technology can provide a filter that is also designed according to a user's own voice samples.

At provide filter operation 425, the disclosed technology provides a filter to the hearing device. The filter can be based on filter settings of the discriminator or based on weights of values of the discriminator. The filter operation 425 can include converting discriminator values to hearing device filter values or settings for a DSP in a hearing device. The filter can be provided via the internet or a mobile phone, software can transmit a filter to a hearing device. The hearing device can use that filter to reduce noise. Additionally, although not shown in FIG. 4, the hearing device can receive feedback from the user that the filter is not working well (e.g., via a survey or user input on a mobile application).

FIG. 5A illustrates a block flow diagram related to step "A" of process 400. Step "A" or process 500 relates to objectively training a GAN network based on mixing speech samples and noise samples.

At mix operation 505, the generator mixes speech and noise samples and provides the mixed signal to a discriminator. The generator can mix the signals at different ratios based on random variation (e.g., 50/50, 60/40, 70/30, etc.). For example, the generator can be randomly selecting a mixing ratio of the speech signal to the noise signal. The generator can also randomly vary the volume, amplitude, or other feature of the speech or noise signal. In some implementations, the generator can use a Gaussian distribution to mix the speech sample with the noise sample to generate a mixed signal. As disclosed in process 400 in FIG. 4, the generator provides the mixed signal to the discriminator and the discriminator filters the mixed signal to remove the noise from the mixed signal. Based on the filtering, the discriminator outputs an output signal.

At operation 510, a speech metric function (e.g., a speech metric function unit) evaluates the output signal. Speech metric function can use MOS or PESQ to measure speech intelligibility. MOS has a scale of 1-5, where 5 means easy to understand and 1 means not possible to understand. In some implementations, the speech metric function may require the output signal to have a 4 or 5 MOS score to consider it to be speech intelligible. In other implementations, speech intelligibility can also be measured using PESQ because it relates to a method of speech quality as provided by the ITU.

At filter operation 515, the filter generator can use values from the discriminator to generate digital filter values for a hearing device filter. Because the discriminator removed noise from the signal, the weights of a filter it used to remove noise or isolate the speech from noise can also be used by the filter generator to generator filter weights.

At test operation 520, the filter generated in filter operation 515 can be tested. For example, the filter can be put in a hearing device and the hearing device user can determine whether the filter is working based on whether speech is intelligible. If the filter is not working, the hearing device can send feedback to the GAN network to adjust the discriminator values or continue training the network.

At operation adjust operation 525, the GAN sends feedback to the discriminator and/or the generator. The provided information can be related to the speech intelligibility of the output signal (e.g., whether the output signal had a high or low speech intelligibility or difference between the output signal and the speech intelligibility index). The generator and/or discriminator can use this information to adjust settings and continue the adversarial training. For example, if the output signal had speech intelligibility, the generator can then mix the noise and sound sample at a different ratio or different volume to FIG. 5B illustrates a block flow diagram related to step "B" of process 530. Step "B" or process 530 relates to training a GAN based on subjective factors.

At mixed signal operation 535, the generator provides a mixed signal to the discriminator and the discriminator attempts to output a speech intelligible signal (e.g., similar to the operations in process 500). The output signal is provided to a HCE.

At feedback operation 530, the HCE provides feedback regarding the speech intelligibility of the output signal. The HCE can rate the signal as having low, medium, or high speech intelligibly. The HCE can also even provide detailed information such as certain frequencies or volumes were too soft or loud. The generator and the discriminator receive this feedback information. The generator can use it generate new mixed signals that are intended to cause the discriminator to produce output signals that are not speech intelligible and the discriminator can use it to adjust its filter settings such that the output signal has speech intelligibility.

At continue training operation 535, the discriminator and the generator continue to use the feedback from the HCE. The discriminator's goal is produce an output signal that is speech intelligible according to the HCE and the generators goal is produce a mixed signal that does not enable the discriminator to produce such an output signal.

FIG. 5C illustrates a block flow diagram for a process 550 for training a GAN and then using that GAN to provide a filter to a hearing device. In some implementations, part of the process 550 may be carried out on more than one device (e.g., on a server, on a computer at HCP's office). The process 550 begins with operation 555 and continues with own voice operation 560.

At ask operation 555, the disclosed technology requests that the user of the hearing device provide own voice samples. This can occur through a mobile phone application, an audio request in the hearing device, or via a notification (e.g., email) to the user. The notification can request that the user speak to provide an own voice sample. The notification can also request that the user record the sample in a quiet environment.

At train GAN operation 560, the disclosed technology provides the own voice samples to the GAN and the GAN utilizes the own voice samples to train the GAN. At minimize error operation 565, the generator and discriminator can train based on the own voice samples until the error rate of the discriminator outputting a speech intelligible signal is minimized. The error rate can be based on the speech metric function.

Aspects and implementations of the processes 400, 500, 530, and 550 of the disclosure have been disclosed in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware such with a wireless communication device or a hearing device.

The phrases "in some implementations," "according to some implementations," "in the implementations shown," "in other implementations," and generally mean a feature, structure, or characteristic following the phrase is included in at least one implementation of the disclosure, and may be included in more than one implementation. In addition, such phrases do not necessarily refer to the same implementations or different implementations.

The techniques introduced here can be embodied as special-purpose hardware (e.g., circuitry), as programmable circuitry appropriately programmed with software or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in an order, alternative implementations may perform routines having steps, or employ systems having blocks, in a different order, and some processes or blocks may be deleted, moved, added, subdivided, combined, or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. As another example, "A or B" can be only A, only B, or A and B.

The invention claimed is:

1. A computer-implemented method for providing a filter to a hearing device, the method comprising:
training a generative adversarial network (GAN) to determine whether a signal includes intelligible speech,
wherein the GAN includes a generator and discriminator,
wherein training includes:
mixing, via the generator, a speech sample from a speech sample database with a noise sample from a noise sample database to produce a first mixed signal,
providing the first mixed signal to the discriminator;
generating, via the discriminator, a first output signal that is based on the discriminator reducing noise in the first mixed signal;

determining whether the first output signal has speech intelligibility based on a speech metric function and/or based on feedback from a hearing care expert;

providing information regarding the speech intelligibility of the first output signal to the generator and the discriminator;

based on the provided information regarding the speech intelligibility of the first output signal, adjusting mixing settings of the generator and providing a second mixed signal to the discriminator based on the adjusted mixed settings;

generating, via the discriminator, a second output signal that is based on the discriminator reducing noise in the second mixed signal; and based on the trained GAN and filter values of the discriminator, providing a filter to a hearing device, wherein the filter is configured to reduce noise in a hearing device signal.

2. The computer-implemented method of claim 1, wherein training the GAN further includes:

determining whether the first and second output signal have speech intelligibility based on own voice samples from a hearing device user of the hearing device.

3. The computer-implemented method of claim 1, wherein the hearing device is an earphone, hearing aid, behind-the-ear hearing aid, in-the-ear hearing aid, or a cochlear device.

4. The computer-implemented method of claim 1, wherein the GAN includes more than 3 layers.

5. The computer-implemented method of claim 1, wherein providing information regarding the speech intelligibility of the first and second output signal providing back propagation information to the generator and the discriminator.

6. The computer-implemented method of claim 1, wherein mixing includes using a Gaussian distribution to mix the speech and noise samples.

7. The computer-implemented method of claim 1, the method further comprises:

accessing the speech sample in a speech sample database, wherein the speech sample was generated in an environment to produce a signal-to-noise ratio (SNR) for the speech samples above an SNR threshold; and accessing the noise sample in a noise sample database.

8. The computer-implemented method of claim 1, wherein the method further comprises:

converting the filter values of the discriminator to filter values for a digital signal processor in the hearing device.

9. A computer program product including instructions that when executed by a processor or processors, cause a device or devices to perform operations, the operations comprising:

training a generative adversarial network (GAN) to determine whether a signal includes intelligible speech, wherein the GAN includes a generator and discriminator, wherein training includes:

mixing, via the generator, a speech sample from a speech sample database with a noise sample from a noise sample database to produce a first mixed signal, providing the first mixed signal to the discriminator;

generating, via the discriminator, a first output signal that is based on the discriminator reducing noise in the first mixed signal;

determining whether the first output signal has speech intelligibility based on a speech metric function and/or based on feedback from a hearing care expert;

providing information regarding the speech intelligibility of the first output signal to the generator and the discriminator;

based on the provided information regarding the speech intelligibility of the first output signal, adjusting mixing settings of the generator and providing a second mixed signal to the discriminator based on the adjusted mixed settings;

generating, via the discriminator, a second output signal that is based on the discriminator reducing noise in the second mixed signal; and based on the trained GAN and filter values of the discriminator, providing a filter to a hearing device, wherein the filter is configured to reduce noise in a hearing device signal.

10. The computer program product of claim 9, wherein the operations further comprise:

determining whether the first and second output signal has speech intelligibility based on own voice samples from a hearing device user of the hearing device.

11. The computer program product of claim 9, wherein providing information regarding the speech intelligibility of the first and second output signal providing back propagation information to the generator and the discriminator.

12. The computer program product of claim 9, wherein mixing includes using a Gaussian distribution to mix the speech and noise samples.

13. The computer program product of claim 9, wherein the operations further comprise:

accessing the speech sample in a speech sample database, wherein the speech sample was generated in an environment to produce a signal-to-noise ratio (SNR) for the speech samples above an SNR threshold; and accessing the noise sample in a noise sample database.

14. The computer program product of claim 9, wherein the operations further comprise:

converting the filter values of the discriminator to filter values for a digital signal processor in the hearing device.

15. A system for providing a filter to a hearing device, the system comprising:

a generative neural network;

a generator configured to produce a mixed signal based on mixing a speech sample with noise sample;

a discriminator configured to produce an output signal based on discriminating between a speech portion of a signal and a noise portion of a signal; and a speech metric unit configured determine whether the output signal includes intelligible speech; and a filter generator configured to communicate with the discriminator and configured to generate filter settings for a filter for a hearing device, wherein the filter settings are associated with settings that the discriminator uses to discriminate between the speech portion of the signal and the noise portion of the signal.

16. The system of claim 15, the system further comprising:

a noise sample dataset;

a speech sample dataset, wherein the speech sample dataset is based on speech samples collected in an environment with high signal-to-noise ratio (SNR).

* * * * *